United States Patent
Sakashita (10) Patent No.: US 8,259,093 B2
(45) Date of Patent: Sep. 4, 2012

(54) IMAGE PROCESSING APPARATUS, METHOD OF CONTROLLING THE SAME, COMPUTER PROGRAM, AND STORAGE MEDIUM

(75) Inventor: Yukihiko Sakashita, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 519 days.

(21) Appl. No.: 12/504,010

(22) Filed: Jul. 16, 2009

(65) Prior Publication Data

US 2010/0026678 A1 Feb. 4, 2010

(30) Foreign Application Priority Data

Jul. 29, 2008 (JP) ................................ 2008-195309

(51) Int. Cl.
G06F 3/038 (2006.01)
G09G 5/00 (2006.01)

(52) U.S. Cl. ............ 345/204; 345/96; 345/99; 345/209; 345/213; 345/214

(58) Field of Classification Search ............ 345/87–104, 345/204–215, 690–699
See application file for complete search history.

(56) References Cited

U.S. PATENT DOCUMENTS

| | | | |
|---|---|---|---|
| 6,501,451 B1 | 12/2002 | Sakashita | |
| 6,650,311 B1 * | 11/2003 | Mori | 345/96 |
| 7,948,463 B2 * | 5/2011 | Kitayama et al. | 345/96 |
| 8,044,910 B2 * | 10/2011 | Song et al. | 345/96 |
| 2003/0020684 A1 * | 1/2003 | Edwards et al. | 345/98 |
| 2003/0058229 A1 * | 3/2003 | Kawabe et al. | 345/204 |
| 2004/0095307 A1 * | 5/2004 | Kim | 345/96 |
| 2005/0007331 A1 * | 1/2005 | Yamazaki et al. | 345/92 |
| 2006/0221069 A1 * | 10/2006 | Sakashita | 345/204 |
| 2007/0262974 A1 * | 11/2007 | Take | 345/204 |
| 2008/0309656 A1 * | 12/2008 | Van Woudenberg et al. | 345/214 |
| 2009/0310077 A1 * | 12/2009 | Kim et al. | 349/151 |
| 2010/0149227 A1 * | 6/2010 | Tomizawa et al. | 345/694 |

FOREIGN PATENT DOCUMENTS

JP 11-126050 5/1999
JP 2002-351382 12/2002

* cited by examiner

Primary Examiner — Lun-Yi Lao
Assistant Examiner — Gene W Lee
(74) Attorney, Agent, or Firm — Cowan, Liebowitz & Latman, P.C.

(57) ABSTRACT

One frame period of image data is divided into a plurality of subframes and driven. A first subframe included in one frame and a second subframe following the first subframe are output at opposite polarities. The image data is output while switching a phase mode between a first mode of driving the first subframe at positive polarity and the second subframe at negative polarity and a second mode of driving the first subframe at negative polarity and the second subframe at positive polarity.

12 Claims, 11 Drawing Sheets

IMAGE PROCESSING APPARATUS, METHOD OF CONTROLLING THE SAME, COMPUTER PROGRAM, AND STORAGE MEDIUM

BACKGROUND OF THE INVENTION

1. Field of the Invention

The present invention relates to an image processing apparatus, a method of controlling the same, a computer program, and a storage medium.

2. Description of the Related Art

An image processing apparatus such as a liquid crystal display apparatus is recently used as a television receiver or a PC display apparatus. Such an image processing apparatus that can be formed thin is widely used because it saves space and power. However, a liquid crystal display apparatus cannot smoothly play back a motion picture because of its slow response. To increase the response speed, a method has been proposed which compares a plurality of image data to be displayed continuously and performs overdrive in accordance with the comparison result (Japanese Patent Laid-Open No. 11-126050).

Another method has been proposed which raises the frame frequency of an input image signal and inserts a black image or an intermediate image, thereby improving motion blurring that occurs due to the display characteristics of an image processing apparatus (Japanese Patent Laid-Open No. 2002-351382).

However, when these driving methods to improve the moving image quality are applied to the image processing apparatus, the display quality may degrade. For example, when the frame frequency is doubled, and different images are displayed in first and second subframes, DC components applied to the liquid crystal are unbalanced, resulting in burn-in.

SUMMARY OF THE INVENTION

The present invention provides to eliminate imbalance in DC components upon driving for improving the moving image quality and simultaneously achieve high image quality and high reliability of a moving image.

According to the first aspect of the present invention, an image processing apparatus comprising:

a driving unit adapted to divide one frame of image data into a plurality of subframes and driving the subframes;

a polarity inversion unit adapted to output a first subframe included in the one frame and a second subframe following the first subframe at opposite polarities; and a control unit adapted to output the image data while switching a phase mode between a first mode of driving the first subframe at positive polarity and the second subframe at negative polarity and a second mode of driving the first subframe at negative polarity and the second subframe at positive polarity.

The second aspect of the present invention, a method of controlling an image processing apparatus which displays a moving image by processing image data, comprising:

the driving step of dividing one frame of the image data into a plurality of subframes and driving the subframes;

the polarity inversion step of outputting a first subframe included in the one frame and a second subframe following the first subframe at opposite polarities; and the control step of outputting the image data while switching a phase mode between a first mode of driving the first subframe at positive polarity and the second subframe at negative polarity and a second mode of driving the first subframe at negative polarity and the second subframe at positive polarity.

Further features of the present invention will become apparent from the following description of exemplary embodiments with reference to the attached drawings.

DESCRIPTION OF THE EMBODIMENTS

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

Figure 1:
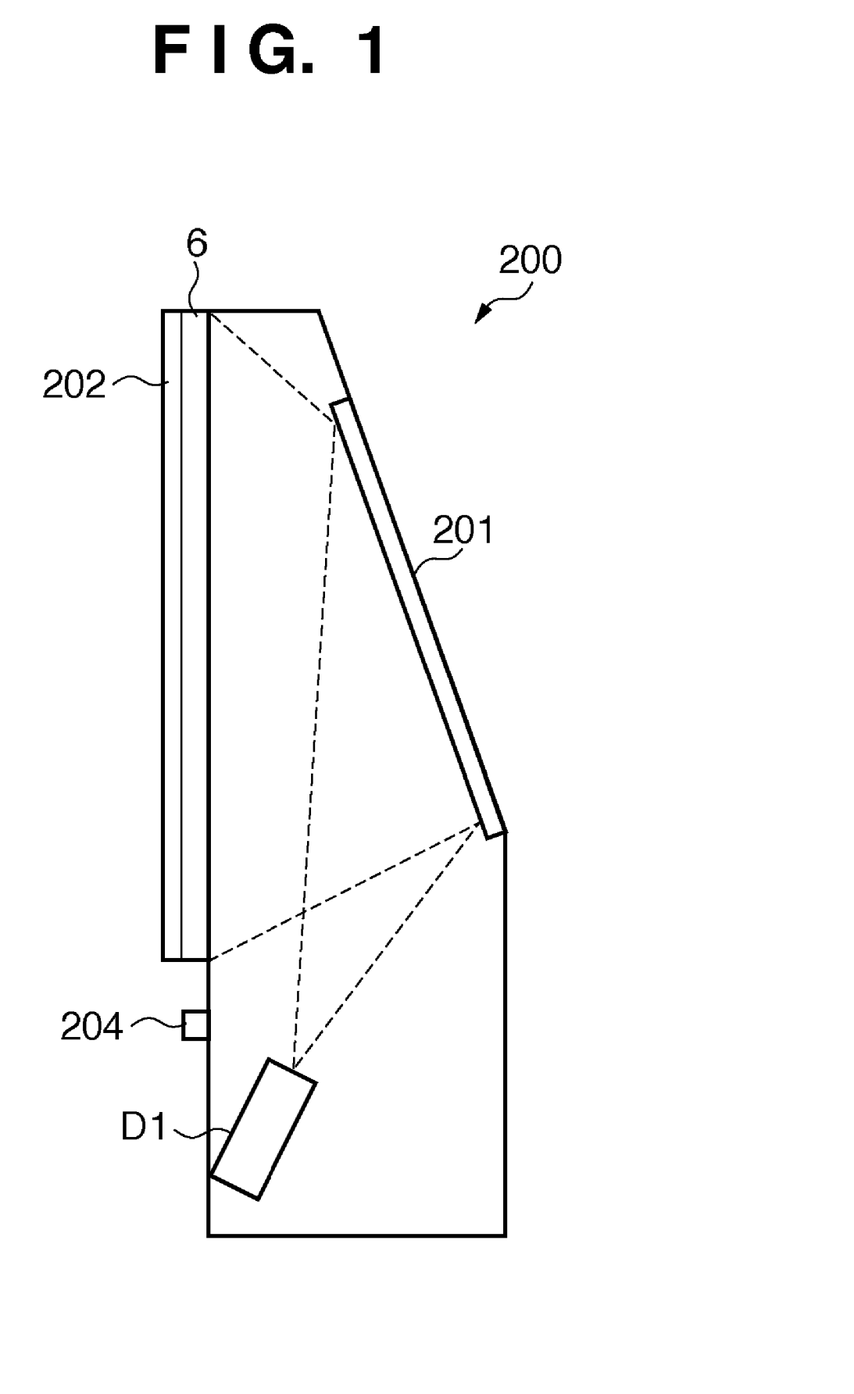
FIG. 1 is a side view showing an example of a rear projection type display apparatus 200 according to the first embodiment of the present invention.

FIG. 1 is a side view showing an example of a rear projection type display apparatus 200 according to the first embodiment of the present invention.

Referring to FIG. 1, a moving image projected from a projection type display engine D1 is reflected by a reflection mirror 201 and projected to the rear side of a screen 6. The screen 6 has a digitizer 202 attached to its front panel. When a user indicates a point on the front panel of the screen 6 with the digitizer 202 using a digitizer pen (not shown), the coordinates of the indicated point are input to the display apparatus 200. Various kinds of digitizers such as those of an optical type, pressure-sensitive type, and ultrasonic type are usable as the digitizer. A brightness control switch 204 controls the brightness of an image to be displayed on the screen 6.

Figure 2:
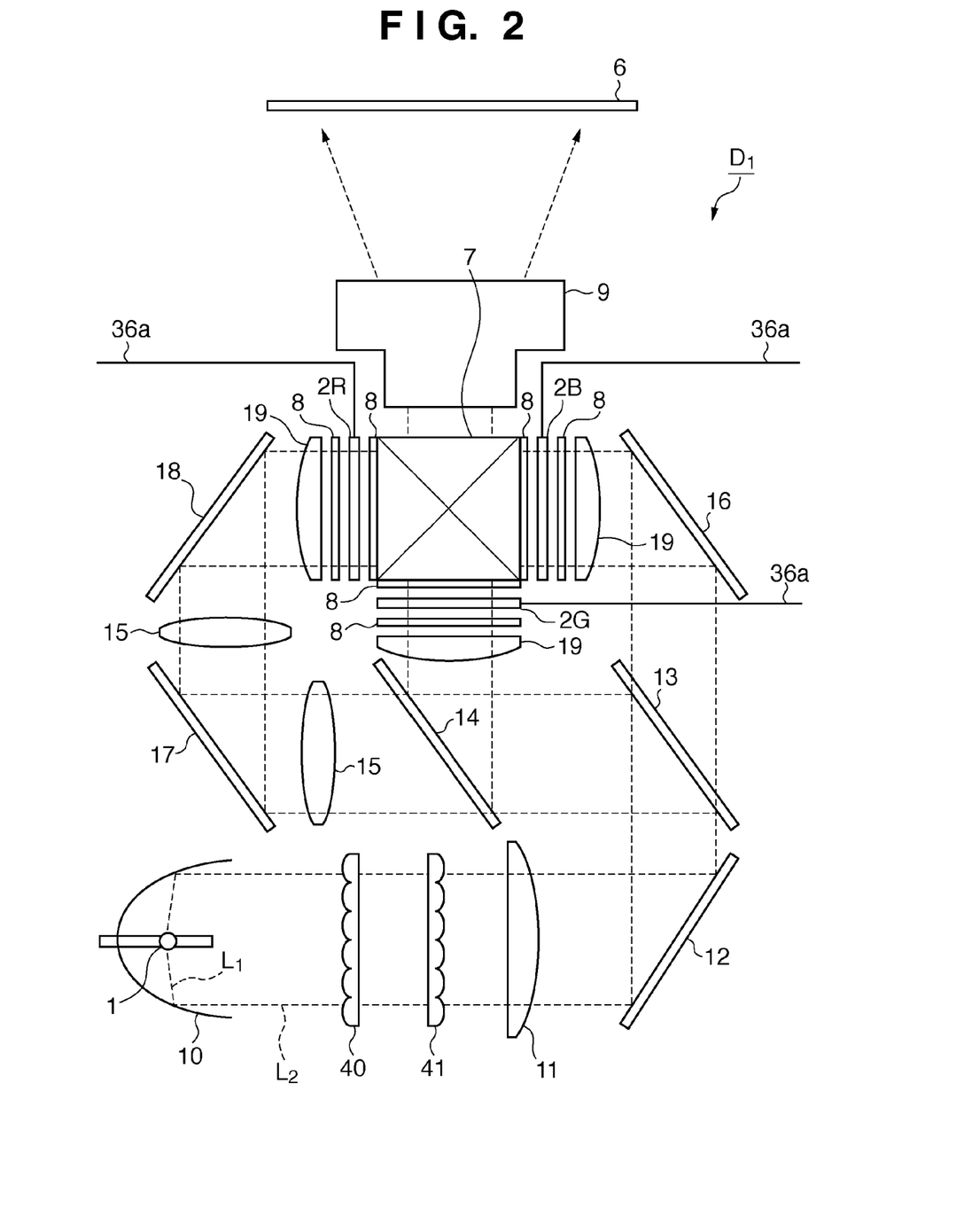
FIG. 2 is a view showing an example of the structure of a projection type display engine D1 according to the first embodiment of the present invention.

The structure of the projection type display engine D1 according to the first embodiment will be described next with reference to FIG. 2. Referring to FIG. 2, three liquid crystal panels 2R, 2G, and 2B corresponding to R, G, and B color display are used as light modulators. The three liquid crystal panels 2R, 2G, and 2B are arranged at positions opposing a cross prism 7. Note that in the first embodiment, TN liquid crystal panels which are driven using TFT are provided as the liquid crystal panels 2R, 2G, and 2B. Polarizing plates 8 are arranged on both sides of each of the liquid crystal panels 2R, 2G, and 2B so as to sandwich the liquid crystal panel. A projection lens 9 and the screen (projection target member) 6 are arranged on the light exit side of the cross prism 7.

A parabolic reflector 10 surrounds a lamp (light source) 1 to convert light L1 emitted by the lamp 1 into a parallel beam L2. The reflector 10 need not always be parabolic. It may have an elliptic shape to convert light into a condensed beam. A metal halide lamp or a xenon lamp is usable as the lamp 1. Flyeye integrators 40 and 41 are arranged on the optical path of the light emitted by the lamp 1 to be conjugate with the liquid crystal panels 2R, 2G, and 2B, thereby improving the nonuniformity of the light source. A relay lens 11 and a mirror 12 are placed sequentially on the light exit side of the flyeye integrators 40 and 41. At the succeeding stage, two dichroic mirrors 13 and 14 split the light emitted by the lamp 1 into three light components. A relay lens 15 and mirrors 16, 17, and 18 guide the light components to the liquid crystal panels 2R, 2G, and 2B. Reference numeral 19 denotes a field lens.

Figure 3:
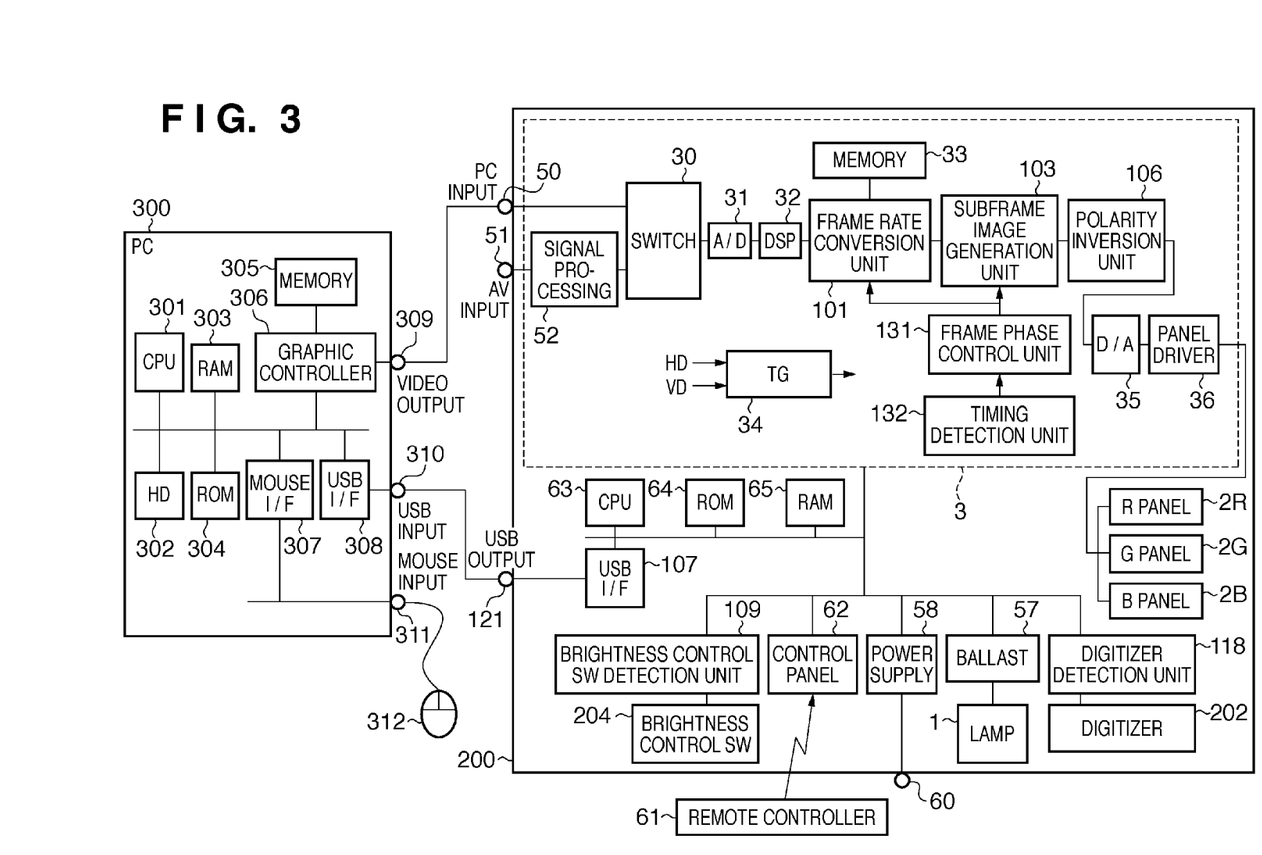
FIG. 3 is a block diagram showing the arrangement of the display engine of the display apparatus according to the first embodiment of the present invention.

Note that a video signal processing unit 3 and the like shown in FIG. 3 are connected to each of the above-described liquid crystal panels 2R, 2G, and 2B.

Electrical signal processing in the projection type display engine D1 according to the first embodiment will be described next. FIG. 3 is a block diagram showing an example of the arrangement of the display engine of the display apparatus 200 according to the first embodiment.

In the video signal processing unit 3, a switch 30 switches between a video signal input from a PC via a PC input terminal 50 and an AV signal input from an AV input terminal 51. The AV signal includes signals of various standards such as NTSC and video signals of general TV broadcast programs. The AV signal also includes a video signal obtained from a recording apparatus (e.g., video deck, DVD recorder, or HDD recorder) for recording a video signal on a medium or a playback apparatus (e.g., DVD player or LD player) for playing back a video signal recorded on a medium. A signal processing circuit 52 performs signal processing such as decoding, noise reduction, bandpass filtering, and signal level adjustment of the AV signal input from the AV input terminal 51. An A/D converter 31 converts the received analog video signal into a digital signal (digital image data).

A DSP (Digital Signal Processor) 32 receives the A/D-converted digital image data, executes predetermined signal processing, and outputs the execution result to a frame rate conversion unit 101. The predetermined signal processing includes image processing such as contrast adjustment, brightness control, color conversion, and resolution conversion. The frame rate conversion unit 101 converts the frame rate of the received image data. A memory 33 holds current image data and image data to be displayed in the next frame.

A timing generation circuit (TG) 34 outputs a timing signal that defines an operation timing to the units of the display apparatus 200. A subframe image generation unit 103 performs processing of improving a moving image characteristic such as motion blurring. A polarity inversion unit 106 inverts the polarity of an image signal based on the input image data.

A frame phase control unit 131 outputs an output frame phase change instruction to the frame rate conversion unit 101 and the subframe image generation unit 103. A timing detection unit 132 detects the frame phase change timing in the frame phase control unit 131. A D/A converter 35 converts the digital image data into an analog image signal and outputs it to a panel driver 36. The analog image signal supplies video signals and power to the R, G, and B liquid crystal panels 2R, 2G, and 2B via the panel driver 36.

FIG. 3 illustrates only analog input signals. However, the present invention is not limited to this. A digital signal input terminal for, for example, LVDS or TMDS, or a D4 terminal for digital TV can also effectively be provided.

A ballast 57 is a lamp power supply connected to the lamp 1. A system power supply 58 is connected to a commercial power supply via an AC inlet 60. A remote controller 61 gives the instruction for various operations of the display apparatus. A control panel 62 receives signals from the remote controller 61.

A brightness control switch detection unit 109 is connected to the brightness control switch 204 to detect its operation. A digitizer detection unit 118 detects a coordinate position indicated on the digitizer 202. A USB interface (I/F) 107 controls communication with another USB-connected PC. A CPU 63 is connected to a ROM 64 and a RAM 65. The CPU 63 is connected to the video signal processing unit 3, control panel 62, ballast 57, brightness control switch detection unit 109, digitizer detection unit 118, USB I/F 107, and the like to control driving of the liquid crystal panels 2R, 2G, and 2B, lamp 1, and the like or enlarge/reduce and move a display image.

In the first embodiment, the brightness control switch detection unit 109, digitizer detection unit 118, USB I/F 107, and the like are connected to the CPU 63. However, they may be incorporated in the CPU 63 or executed in accordance with programs.

The arrangement of a PC (Personal Computer) 300 connected to the display apparatus 200 will be described next. The PC 300 includes a CPU 301, HD (Hard Disk) 302, RAM 303, ROM 304, video memory 305, graphic controller 306, mouse I/F 307, and USB I/F 308. The PC 300 also includes a video output terminal 309, USB input terminal 310, and mouse input terminal 311. A mouse 312 functions as a pointing device and is connected to the mouse input terminal 311.

The operation of the display apparatus 200 according to the first embodiment will be described next in detail with reference to FIGS. 3 to 8.

In the display apparatus 200, the switch 30 first selects one of a video signal input from the PC input terminal 50 and a video signal input from the AV input terminal 51. The A/D converter 31 converts the selected analog video signal into a digital signal. A DSP 32 performs image processing such as contrast adjustment, brightness control, and color conversion for the digital image data. The frame rate conversion unit 101 converts the image data output from the DSP 32 into data having a desired resolution and frame rate.

The frame rate conversion unit 101 divides one frame into N subframes. N is an arbitrary integer larger than 1. The frame rate rises by N times in accordance with the number of subframes. In the first embodiment, an example of N division will be explained in which N=2, and more specifically, an input video signal having a vertical frequency of 60 Hz is converted into a signal having a vertical frequency of 120 Hz by doubling the frame rate. At this time, input image data of at least one frame is stored in the memory 33. Changing the speed of reading out image data from the memory 33 enables to convert the input image signal into an image signal having a different frame rate. Additionally, increasing or decreasing the number of subframes to be read out from the memory 33 allows changing the phase of an output frame.

Figure 4:
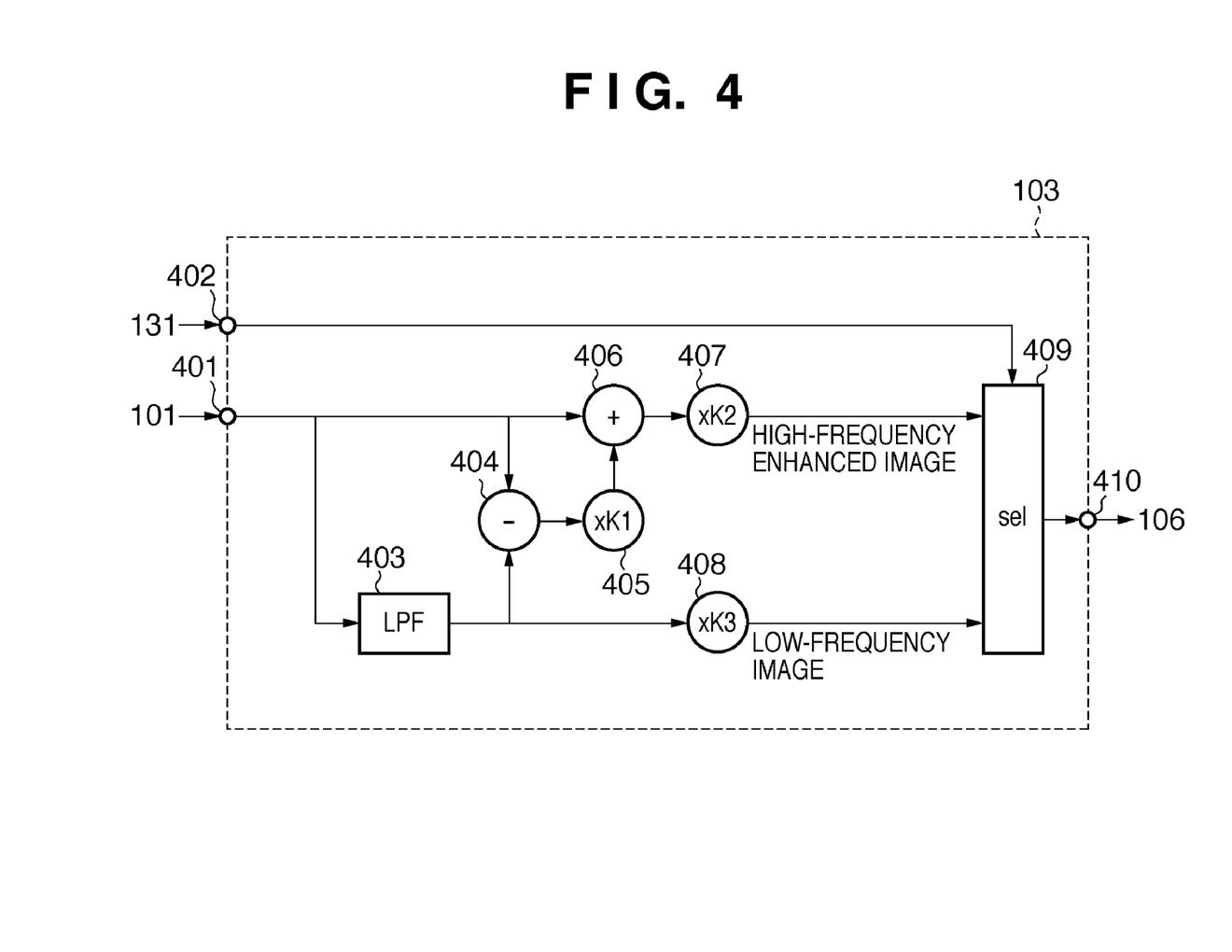
FIG. 4 is a block diagram of a subframe image generation unit 103 according to the first embodiment of the present invention.

FIG. 4 is a block diagram for explaining the operation of the subframe image generation unit 103 in detail. An image output from the frame rate conversion unit 101 is input to the subframe image generation unit 103. The subframe image generation unit 103 alternately outputs an image that enhances a high-frequency component and a low-frequency component image.

The video signal output from the frame rate conversion unit 101 is input to an input terminal 401 of the subframe image generation unit 103 (FIG. 4). A low-pass filter 403 cuts the high-frequency component and outputs a low-frequency component image. A multiplier 408 multiplies the low-frequency component image by a predetermined coefficient K3. A selector 409 selectively outputs the low-frequency component image. A subtracter 404 subtracts the output signal from the low-pass filter 403 from the image input from the input terminal 401, thereby obtaining a high-frequency component image. A multiplier 405 multiplies the high-frequency component image by a predetermined coefficient K1. An adder 406 adds the high-frequency component image to the original image input from the input terminal 401. A high-frequency component enhanced image is obtained by adding the high-frequency component image to the original image. A multiplier 407 multiplies the high-frequency component enhanced image by a predetermined coefficient K2. An output terminal 410 outputs the high-frequency component enhanced image via the selector 409.

An input terminal 402 inputs, to the selector 409, a selection signal output from the frame phase control unit 131. The output terminal 410 selectively outputs the high-frequency component enhanced image and the low-frequency component image.

<Problem>

A problem that arises without frame phase change will be described with reference to FIGS. 5 to 8.

Figure 5:
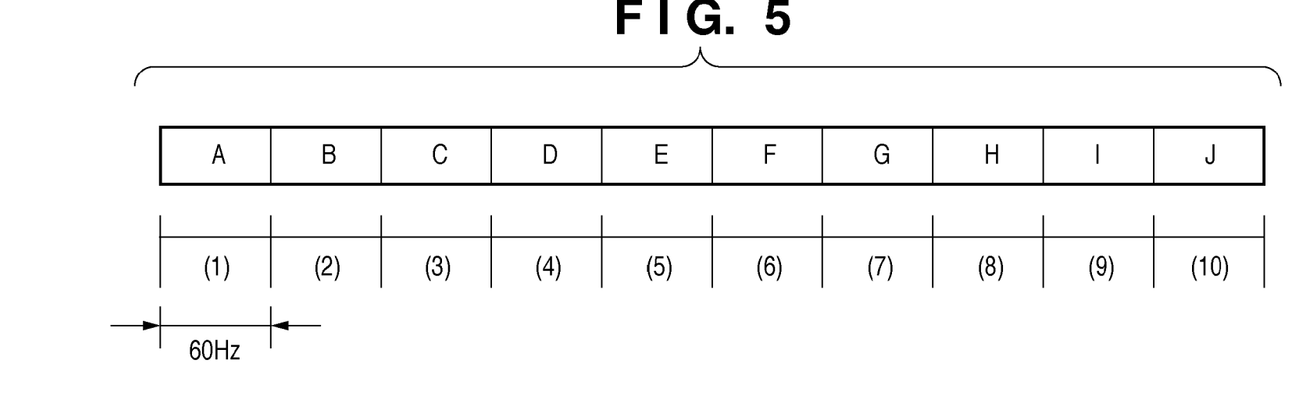
FIG. 5 is a view showing an example of image data input to a frame rate conversion unit 101 according to the first embodiment of the present invention.

FIG. 5 illustrates a 60-Hz progressive signal input to the frame rate conversion unit. Images A to J are sequentially input at a frame rate of 60 Hz.

Figure 6:
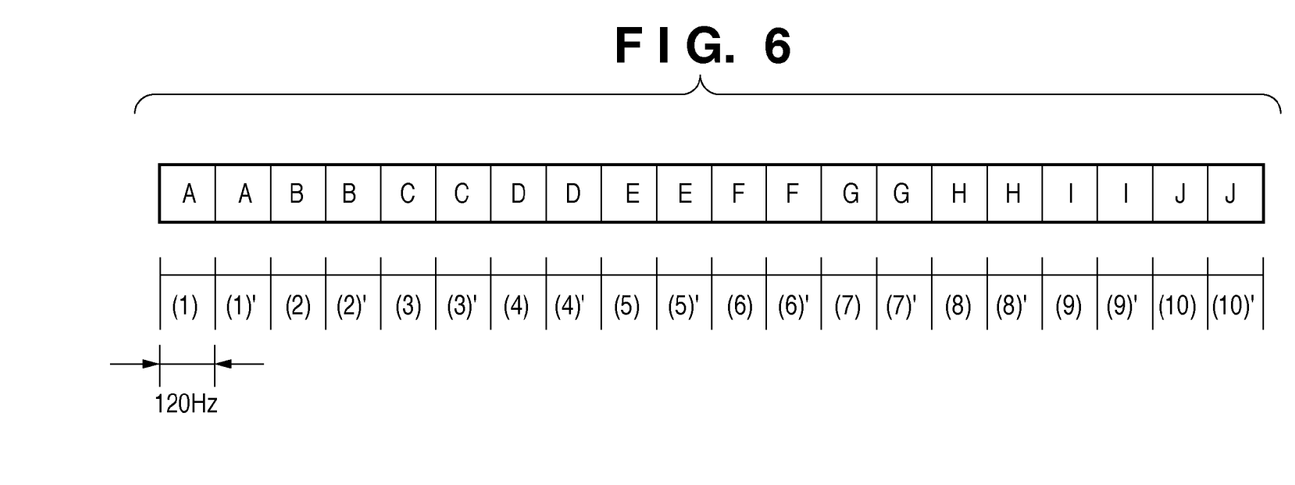
FIG. 6 is a view showing an example of image data output from the frame rate conversion unit.

FIG. 6 shows a video signal converted from 60 Hz to 120 Hz by the frame rate conversion unit 101. A frame of 60 Hz is divided into first and second subframes adjacent to each other at 120 Hz. Identical images are continuously output to the two subframes in correspondence with one input frame image.

Figure 7:
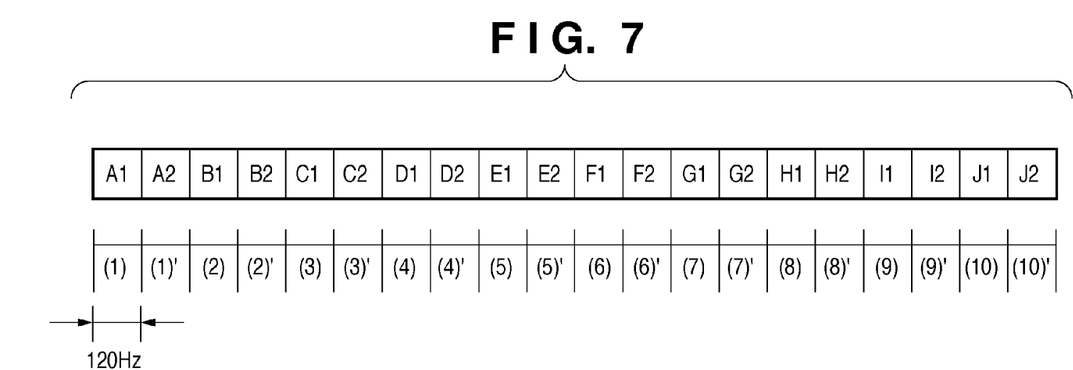
FIG. 7 is a view showing an example of image data output from the subframe image generation unit.

FIG. 7 illustrates a 120-Hz video signal after frame rate conversion, which is output from the subframe image generation unit as high-frequency component enhanced images and low-frequency component images. Of the two continuous subframes, the first subframe outputs a high-frequency component enhanced image, and the second subframe outputs a low-frequency component image.

Figure 8:
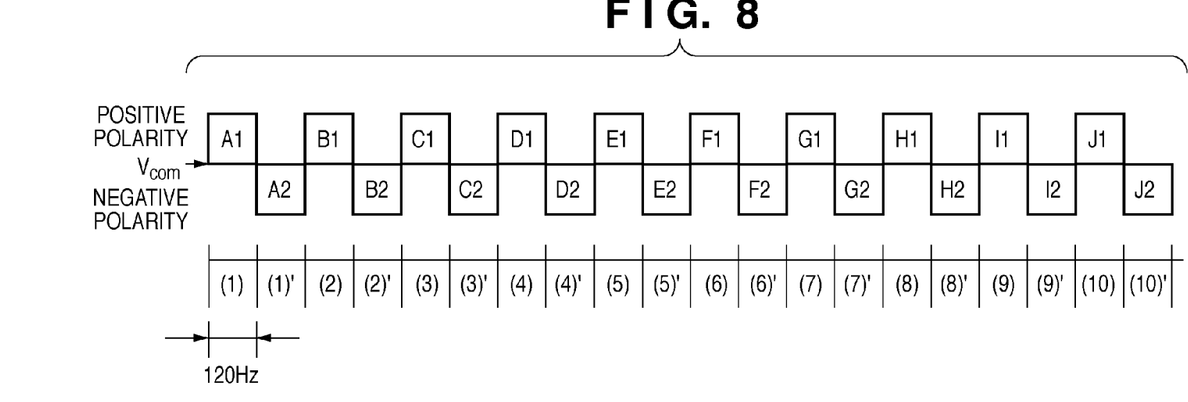
FIG. 8 is a view showing an example of image data output after polarity inversion.

FIG. 8 shows a signal output by causing the polarity inversion unit 106 to invert the polarity every other subframe after conversion to 120 Hz. As shown in FIG. 8, after polarity inversion, the high-frequency component enhanced images are driven only at positive polarity, whereas the low-frequency component images are driven only at negative polarity.

As described above, conventionally, continuously input signals are driven at a doubled frame rate. After doubling the frame rate, each first subframe displays a high-frequency component enhanced image, and each second subframe displays a low-frequency component image. At this time, driving is performed while inverting the polarity every other subframe. For this reason, the first subframes always display high-frequency component enhanced images at the same polarity, resulting in imbalance in the DC components.

<Solution>

In the first embodiment, the frame phase control unit 131 controls the phase of image readout from the memory 33 at a predetermined timing, thereby controlling the process of the subframe image generation unit 103.

Figure 12:
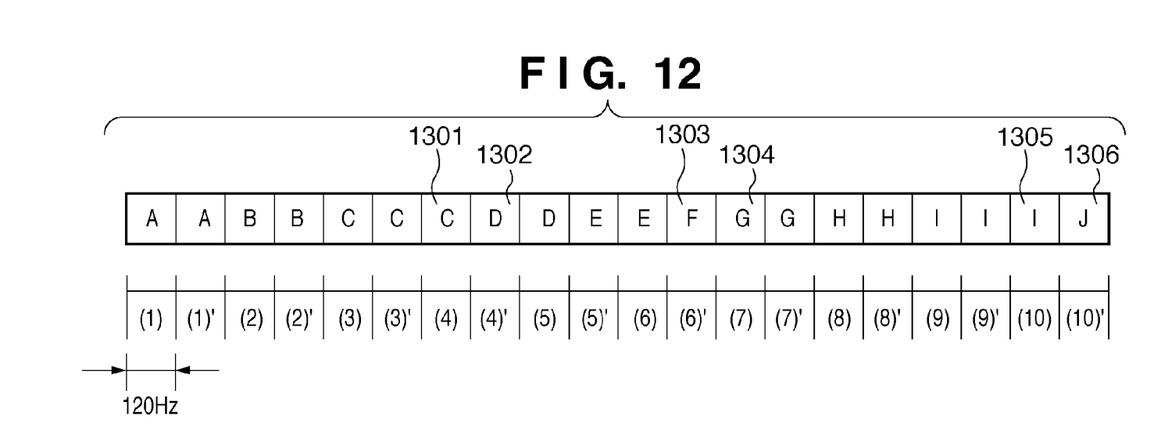
FIG. 12 is a view showing an example of image data output from the frame rate conversion unit 101 of the display apparatus according to the first embodiment of the present invention.

An example of display frame phase switching will be described with reference to FIGS. 12 to 14. FIG. 12 shows a video signal converted from 60 Hz to 120 Hz and output from the frame rate conversion unit 101 upon frame readout control. The phase is changed in a subframe (4) in FIG. 12. Hence, the subframe (4) outputs one more image C 1301 which is the same as subframes (3) and (3)'. The next images D to E are output by twos from a subsequent subframe (4)'. The frame phase is changed again in a subframe (7). Hence, a subframe (6)' outputs only one image F 1303. The subframe (7) outputs not the image F but an image G 1304. The frame phase is thus changed by increasing or decreasing the number of subframes.

Figure 13:
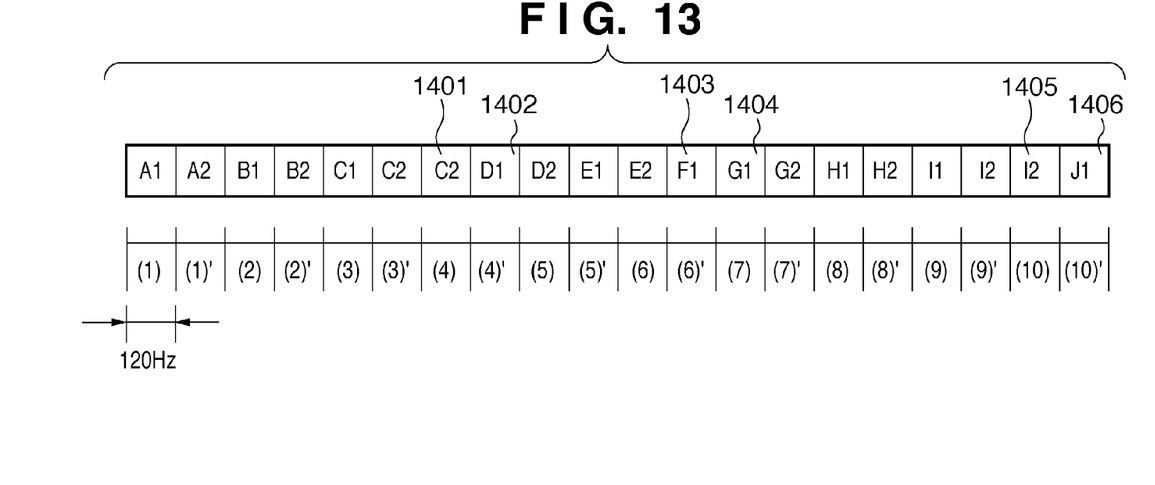
FIG. 13 is a view showing an example of image data output from the subframe image generation unit 103 of the display apparatus according to the first embodiment of the present invention.

FIG. 13 illustrates a 120-Hz video signal after frame rate conversion which is output from the subframe image generation unit 103 as high-frequency component enhanced images and low-frequency component images upon frame readout control in accordance with the phases of readout frames. The high-frequency component enhanced images and the low-frequency component images are output in accordance with the number of subframes which is increased or decreased by the frame rate conversion unit 101. A subframe 1401 that is added to output the same image outputs a low-frequency component image. Since two low-frequency component images are output continuously, the output phases of the high-frequency component enhanced images and low-frequency component images change.

Figure 14:
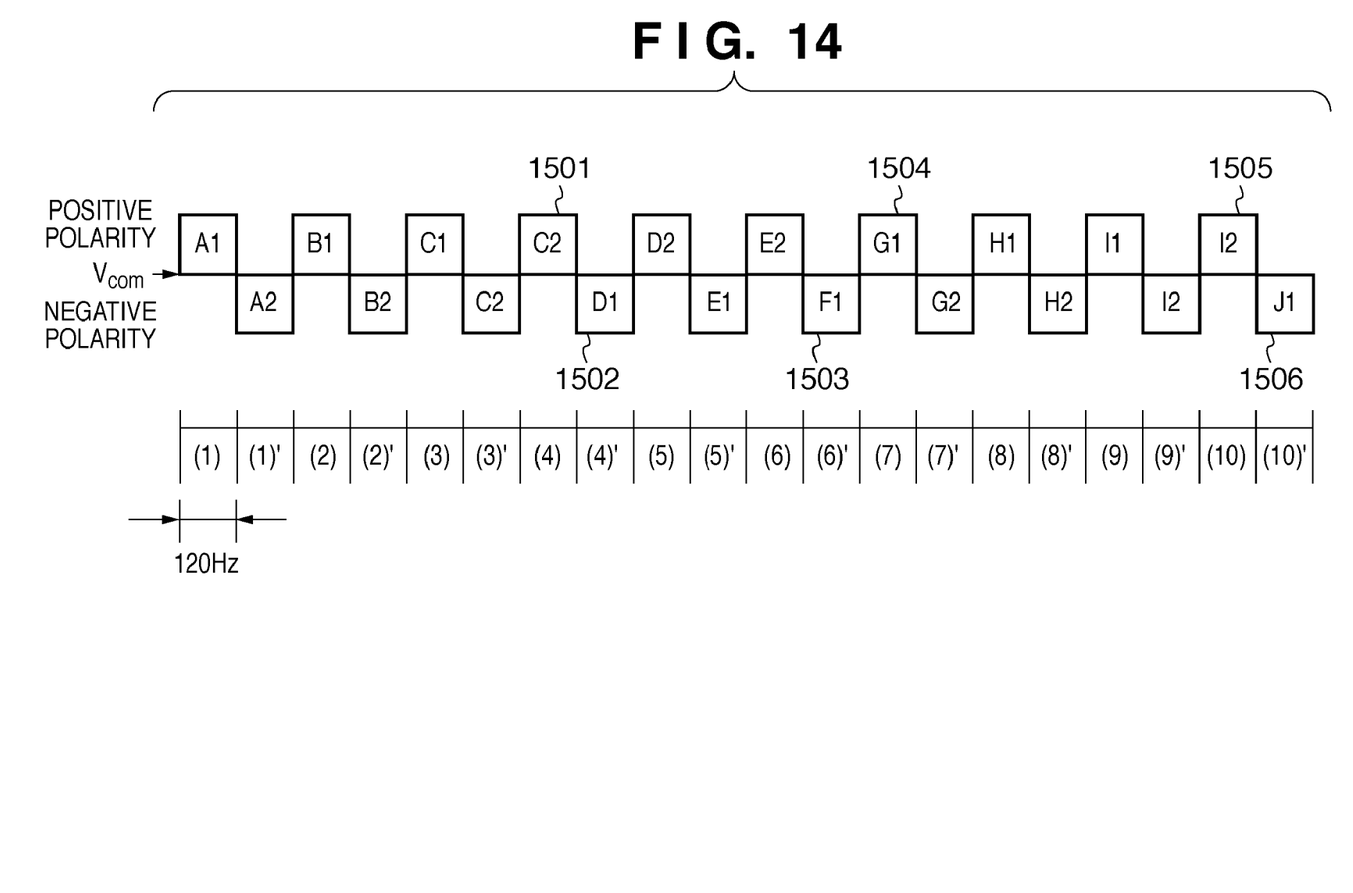
FIG. 14 is a view showing an example of image data output from a polarity inversion unit 106 of the display apparatus according to the first embodiment of the present invention.

FIG. 14 shows a signal output by causing the polarity inversion unit 106 to invert the polarity every other subframe after conversion to 120 Hz. The polarity is inverted every other subframe in the image after the output phases of the high-frequency component enhanced images and low-frequency component images have changed. For this reason, the image frame phase can be changed with respect to the polarity inversion cycle. This improves the imbalance in the DC components.

The image signal output from the output terminal 410 of the subframe image generation unit 103 is input to the polarity inversion unit 106. The polarity inversion unit 106 outputs the doubled images alternately as signals of positive and negative polarities with respect to the common electrode voltage of the liquid crystal panel, as shown in FIG. 14. Alternately outputting images at positive and negative polarities enables to obtain display free from flicker.

It is possible to obtain a display apparatus which improves motion blurring by displaying an image that has undergone motion correction processing of correcting the frequency components of the image in accordance with a subframe.

When image data is input at 60 Hz, the display refresh rate is changed to 120 Hz. This makes flicker visually undetectable even in frame inversion driving of inverting the driving polarity for each frame and enables flickerless display at high image quality.

As described above, according to the first embodiment, even when the first and second subframes display different images, the first mode of driving a first subframe at positive polarity and a second mode of driving a first subframe at negative polarity are switched at a predetermined timing. This makes it possible to provide a reliable display apparatus which improves imbalance in the DC components and causes no burn-in even when overdrive, black image insertion, or intermediate image insertion is performed. The polarity inversion driving is continuously performed every other subframe. For this reason, the polarity inversion cycle does not change, and image quality degradation such as flicker hardly occurs.

Second Embodiment

Figure 9:
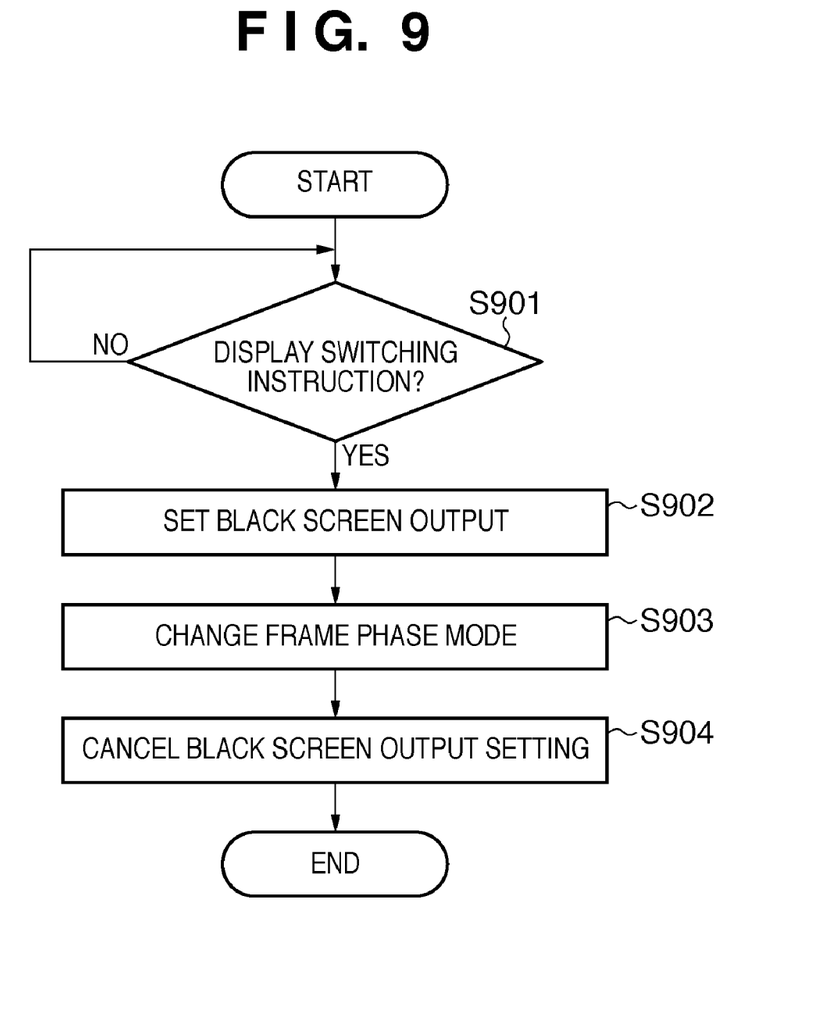
FIG. 9 is a flowchart illustrating an example of display frame phase switching processing according to the second embodiment of the present invention.

In the second embodiment of the present invention, the user operates a remote controller 61 to switch the input signal to a display apparatus 200. The frame phase is switched in accordance with the timing of input signal switching. The frame phase switching processing will be described with reference to FIG. 9. FIG. 9 is a flowchart illustrating an example of frame phase switching processing. As the input signal switching processing, for example, a case can be considered in which video 1 serving as the first input unit is switched to video 2 serving as the second input unit.

First, the user performs an input switching operation on the remote controller 61 serving as an input switching reception unit. In step S901, a control panel 62 receives a signal as a switching instruction transmitted from the remote controller 61 in accordance with the operation. The control panel 62 notifies a CPU 63 of reception of the signal from the remote controller 61. In accordance with the notification, the CPU 63 changes the display screen to black display in step S902 by controlling a DSP 32. When the display screen changes to black display, it does not display switching noise generated by a switch 30 upon input switching.

During black screen display, the CPU 63 controls a frame phase control unit 131 to output a frame phase change instruction to a frame rate conversion unit 101 and a subframe image generation unit 103 and change the frame phase in step S903. If the mode before the change is the first mode of driving a first subframe at positive polarity, the mode changes to the second mode of driving a second subframe at positive polarity. To the contrary, if the mode before the change is the second mode, it changes to the first mode. In step S903, the CPU 63 also gives an instruction to change the connection destination of the switch 30 and switch the input terminal to a PC input terminal 50 or an AV input terminal 51. In step S904, the CPU 63 cancels the black display setting by the DSP 32.

Such display frame phase switching during black screen display upon input switching improves image quality degradation which is caused by display screen flicker or an unnatural moving image generated by an increase or decrease in the number of output subframes corresponding to one frame input at the time of display frame phase switching.

Note that in FIG. 9, the display frame phase is switched in accordance with the input signal switching operation on the remote controller 61. However, the trigger of change is not limited to the input signal switching operation. The display frame phase may be changed in accordance with, for example, a broadcast program switching (channel switching) operation.

As described above, according to the second embodiment, since the driving voltage in forward driving balances with that in reverse driving, the reliability of the display image improves.

Third Embodiment

The third embodiment of the present invention will be described next. In the third embodiment, a method of switching the display frame phase with respect to the phase of polarity inversion more often than in the above-described second embodiment will be explained.

Figure 10:
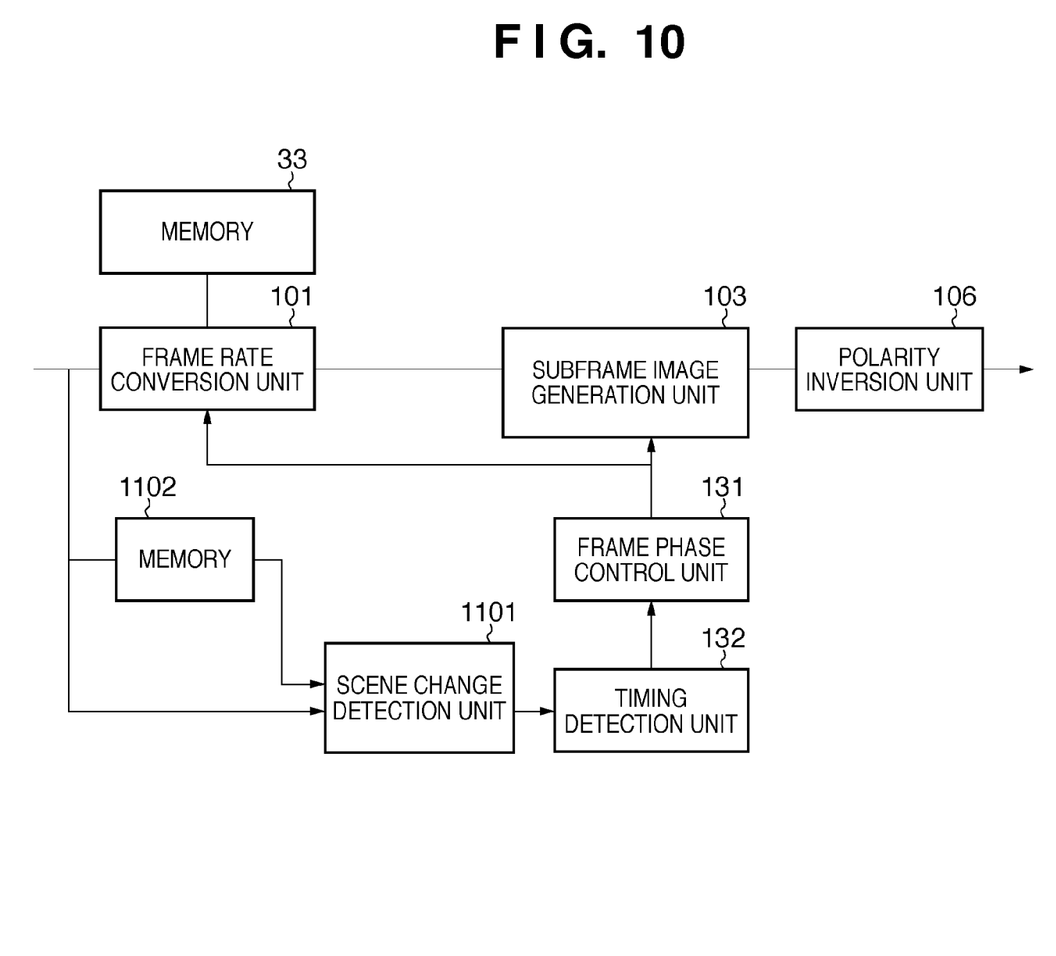
FIG. 10 is a block diagram showing an example of the arrangement of a signal processing system according to the third embodiment of the present invention.

FIG. 10 is a block diagram showing an example of a signal processing system according to the third embodiment. The arrangement in FIG. 10 is wherein a scene change detection unit 1101 is newly included after a frame rate conversion unit 101 in FIG. 3.

The scene change detection unit 1101 compares the average luminance value of a preceding frame image output from a memory 1102 with that of a current frame image output from the frame rate conversion unit 101 and determines based on the degree of change whether a scene change exists. In the third embodiment, the presence/absence of a scene change is determined by checking whether the average luminance value has changed by 50%.

Upon detecting a scene change, the scene change detection unit 1101 notifies a timing detection unit 132 of the occurrence of the scene change. In accordance with the notification, the timing detection unit 132 notifies a frame phase control unit 131 of the timing of frame phase change. The frame phase control unit 131 sets the output frame phase based on the notification and outputs a frame phase change instruction to the frame rate conversion unit 101 and a subframe image generation unit 103. Accordingly, the frame phase of the image signal is changed in accordance with the order of polarity inversion by a polarity inversion unit 106. More specifically, if the mode before the change is the first mode of driving a first subframe at positive polarity, the mode changes to the second mode of driving a second subframe at positive polarity. To the contrary, if the mode before the change is the second mode, it changes to the first mode.

Upon display frame phase switching, the user may perceive image quality degradation which is caused by display screen flicker or an unnatural moving image generated by an increase or decrease in the number of output subframes corresponding to one frame input. However, such image quality degradation can be prevented by changing the phase in a situation such as a scene change with a large luminance change on the screen.

In the third embodiment, the presence/absence of a scene change is determined based on the average luminance. However, the present invention is not limited to this. Maximum and minimum luminance values, color information, or scene information embedded in a video in advance is also usable.

As described above, according to the third embodiment, it is possible to change the display frame phase order more often using occurrence of a scene change as a trigger. Since the driving voltage in forward driving balances with that in reverse driving, the reliability further improves.

Fourth Embodiment

An image processing apparatus according to the fourth embodiment of the present invention applies the display frame phase order switching to a projection type display apparatus including an aperture mechanism for controlling the amount of light to be projected.

Figure 11:
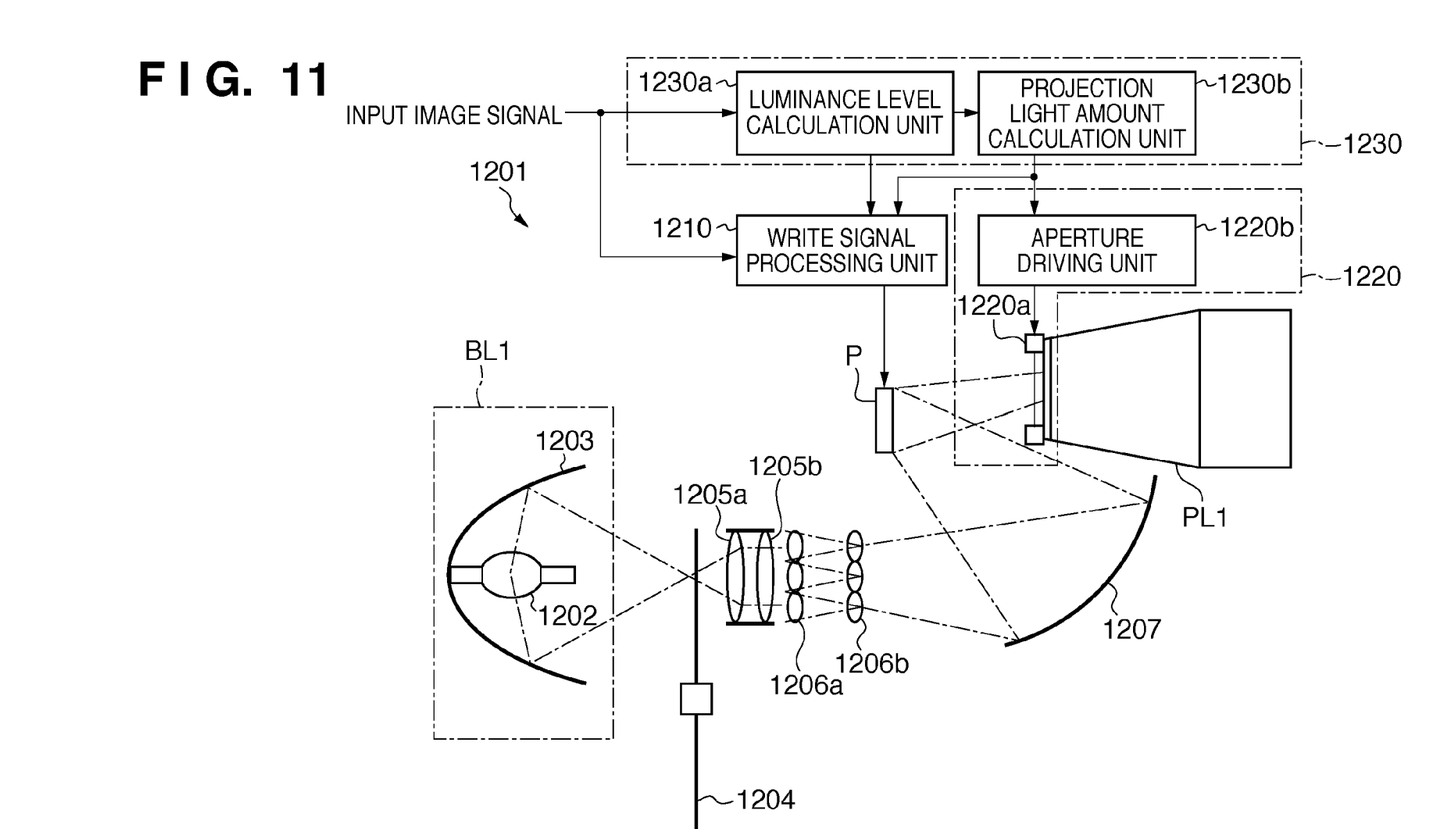
FIG. 11 is a view showing an example of the arrangement of a projection type image display apparatus according to the fourth embodiment of the present invention.

FIG. 11 is a view showing an example of the arrangement of a projection type image display apparatus according to this embodiment. Referring to FIG. 11, a projection type image display apparatus 1201 includes a light modulator P, illumination device BL1, and projection optical system PL1. The projection type image display apparatus 1201 displays an image by projecting projection light onto a screen (not shown).

The light modulator P controls the light transmission or reflection state, thereby displaying a halftone image. The projection optical system PL1 projects light that irradiates the light modulator P and is transmitted through or reflected by it. The illumination device BL1 including a reflector 1203 and an arc tube 1202 irradiates the light modulator P with light. A color filter 1204, telecentric lenses 1205a and 1205b, and flyeye integrators 1206a and 1206b are arranged between the illumination device BL1 and the light modulator P. Light integrated by the flyeye integrators 1206a and 1206b is condensed onto the light modulator P by a condensing reflection mirror 1207.

The projection type image display apparatus 1201 further includes a write signal processing unit 1210, projection light amount control unit 1220, and control signal generation unit 1230. The write signal processing unit 1210 modulates a write signal to the light modulator P. The projection light amount control unit 1220 controls the amount of light transmitted through or reflected by the light modulator P. The control signal generation unit 1230 controls the write signal processing unit 1210 and the projection light amount control unit 1220.

The control signal generation unit 1230 generates a control signal based on the luminance level of an input image signal to increase the projection light amount and reduce the write signal modulation at a higher luminance level (i.e., as the luminance level rises). The control signal generation unit 1230 generates a control signal to decrease the projection light amount and increase the write signal modulation at a lower luminance level (i.e., as the luminance level lowers).

In the fourth embodiment, the projection optical system PL1 can be formed from a so-called schlieren optical system. The projection light amount control unit 1220 includes a movable aperture unit 1220a and an aperture driving unit 1220b and is arranged not to be conjugate with the light modulator P. The projection light amount control unit 1220 controls the aperture amount by causing the aperture driving unit 1220b to open or close the movable aperture unit 1220a in accordance with the luminance level of an input image signal.

The control signal generation unit 1230 includes a luminance level calculation unit 1230a which calculates the luminance level of an input image signal, and a projection light amount calculation unit 1230b which calculates the amount of projection light to be output from the projection optical system in accordance with the calculated luminance level. The control signal generation unit 1230 generates the control signal of the projection light amount control unit 1220 based on the projection light amount calculated by the projection light amount calculation unit 1230b. The control signal generation unit 1230 also generates the control signal of the write signal processing unit 1210 based on the calculated projection light amount and the luminance level calculated by the luminance level calculation unit 1230a.

The luminance level calculation unit 1230a calculates, as the maximum luminance, the maximum value of the luminance signals of the pixels in each field or each frame of an input image signal. In this case, the calculation can be done by sequentially comparing the input image signal in one field or one frame. Alternatively, the cumulative histogram of the luminance signals of pixels is calculated, and a luminance level at which the cumulative histogram has a predetermined value or more is calculated as the maximum luminance.

When the luminance level calculation unit 1230a sets the maximum luminance or average luminance to a predetermined level or less, proper black display with little impure black can be obtained by stopping down the movable aperture unit 1220a to reduce the projection light amount.

The frame phase is switched at that timing. More specifically, if the mode before the change is the first mode of driving a first subframe at positive polarity, the mode changes to the second mode of driving a second subframe at positive polarity. To the contrary, if the mode before the change is the second mode, it changes to the first mode. This enables to switch the frame phase without degradation in display quality caused by flicker.

This mode change timing is useful because image quality degradation caused by flicker perceived upon changing the display frame phase order can be prevented even if the light amount largely changes due to a large controlled variable of the movable aperture unit 1220a. In this case, the phase order change timing can be decided by setting a threshold for the controlled variable and comparing the controlled variable with the threshold.

In the fourth embodiment, a method of causing the movable aperture unit 1220a serving as a light amount modulation unit to control the amount of light reflected by the light modulator P has been described. However, the present invention is not limited to this. For example, the light amount modulation unit may control the amount of light to irradiate the light modulator P. The light amount modulation unit can control the light amount using not the aperture but, for example, deflection of light.

The light modulator P is applicable not only to a reflection type device such as an LCOS or DMD but also to a transmission type liquid crystal panel.

As described above, according to the fourth embodiment, it is possible to change the display frame phase more often using the light amount control state as a trigger. Since the driving voltage in forward driving balances with that in reverse driving, the reliability further improves.

Fifth Embodiment

In the fifth embodiment, the display frame phase is switched by a method simpler than in the above-described first to fourth embodiments.

A CPU 63 detects that a power SW serving as a power supply control unit turns on a power supply 58 serving as a power supply unit to start supplying operating power, and reads out the frame phase mode upon preceding power-off from a nonvolatile RAM 65. The CPU 63 sets, in a frame phase control unit 131, a frame phase mode different from that read out from the RAM 65. The frame phase control unit 131 drives the display panel in the frame phase mode different from the preceding mode. More specifically, if the mode before the change is the first mode of driving a first subframe at positive polarity, the mode changes to the second mode of driving a second subframe at positive polarity. To the contrary, if the mode before the change is the second mode, it changes to the first mode.

When the power SW turns off the power supply 58, the CPU 63 detects stop of operating power supply and writes frame phase information upon power-off in the nonvolatile RAM 65.

As described above, according to the fifth embodiment, it is possible to change the display frame phase mode more often because the mode is changed using ON/OFF of the power switch as a trigger. Since the driving voltage in forward driving balances with that in reverse driving, the reliability further improves.

In the fifth embodiment, an example has been described in which the frame phase order is changed upon power-on. However, the present invention is not limited to this. For example, the frame phase order may be changed upon power-off.

Sixth Embodiment

The sixth embodiment of the present invention will be described. In this embodiment, the frame phase order is switched by a method simpler than in the above-described embodiments.

Every time a predetermined time is measured using the clocking function of a CPU 63, a frame phase control unit 131 changes the frame phase mode. The switching interval can be about 10 to 60 min at most because of the characteristics of a liquid crystal.

The clocking function may be combined with the above-described embodiments to detect various conditions upon detecting the arrival of a predetermined timing. More specifically, when input switching or channel switching is done, or a scene change occurs after the arrival of a predetermined time, the frame order can be changed. This enables to change the frame phase order periodically and prevent image quality degradation upon change.

As described above, according to the sixth embodiment, since only correction of a video signal suffices, the present invention is applicable to a general image processing apparatus without adopting any special liquid crystal structure. It is also possible to provide a display apparatus which ensures high image quality without degrading the reliability.

Other Embodiments

In the above embodiments, a display apparatus has been described as a typical example of an image processing apparatus. However, the image processing apparatus can be any device other than a display apparatus if it controls the frame phase as in the present invention. For example, the present invention is applicable to various devices such as a set-top box associated with a display apparatus, a video recorder, or a computer having an AV function. The present invention is also applicable to a system including a plurality of devices (e.g., computer and interface device) or an apparatus (e.g., TV set, display, or portable information terminal) including a single device.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

According to the present invention, it is possible to eliminate imbalance in DC components upon driving for improving the moving image quality and simultaneously achieve high image quality and high reliability of a moving image.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-195309, filed Jul. 29, 2008, which is hereby incorporated by reference herein in its entirety.

What is claimed is:

1. An image processing apparatus comprising:
a driving unit adapted to divide one frame of image data into a plurality of subframes and driving the subframes;
a polarity inversion unit adapted to output a first subframe included in said one frame and a second subframe following the first subframe at opposite polarities,
a control unit adapted to output the image data while switching a phase mode between a first mode of driving the first subframe at positive polarity and the second subframe at negative polarity and a second mode of driving the first subframe at negative polarity and the second subframe at positive polarity;
a first input unit and a second input unit adapted to input the image data; and
an input switching unit adapted to switch between said first input unit and said second input unit and causing one of said first input unit and said second input unit to input the image data,
wherein said control unit switches the phase mode between the first mode and the second mode in accordance with a timing of causing said input switching unit to switch between said first input unit and said second input unit.

2. The apparatus according to claim 1, wherein when one of said first input unit and said second input unit inputs image data of a program broadcast using a plurality of channels,
said input switching unit further receives a channel switching instruction, and
said control unit switches the phase mode between the first mode and the second mode when said input switching unit has received the channel switching instruction.

3. The apparatus according to claim 1, wherein when said control unit is to switch the frame phase, said control unit is driven to perform black display.

4. A computer program stored on a non-transitory computer-readable storage medium which causes a computer to function as an image processing apparatus including each unit of claim 1.

5. An image processing apparatus comprising:
a driving unit adapted to divide one frame of image data into a plurality of subframes and driving the subframes;
a polarity inversion unit adapted to output a first subframe included in said one frame and a second subframe following the first subframe at opposite polarities;
a control unit adapted to output the image data while switching a phase mode between a first mode of driving the first subframe at positive polarity and the second subframe at negative polarity and a second mode of driving the first subframe at negative polarity and the second subframe at positive polarity; and
a determination unit adapted to determine whether a scene change exists in a plurality of continuous image data,
wherein upon determining that the scene change exists, said control unit switches the phase mode between the first mode and the second mode.

6. The apparatus according to claim 5, wherein said determination unit determines, based on a degree of a change in a luminance value of the image data, whether the scene change has occurred.

7. A computer program stored on a non-transitory computer-readable storage medium which causes a computer to function as an image processing apparatus including each unit of claim 5.

8. An image processing apparatus comprising:
a driving unit adapted to divide one frame of image data into a plurality of subframes and driving the subframes;
a polarity inversion unit adapted to output a first subframe included in said one frame and a second subframe following the first subframe at opposite polarities;
a control unit adapted to output the image data while switching a phase mode between a first mode of driving the first subframe at positive polarity and the second subframe at negative polarity and a second mode of driving the first subframe at negative polarity and the second subframe at positive polarity; and
a light amount control unit adapted to control an amount of light to be output from the image processing apparatus,
wherein when the light amount controlled by said light amount control unit is not more than a predetermined level, or when a controlled variable of the light amount by said light amount control unit exceeds a predetermined controlled variable, said control unit switches the phase mode between the first mode and the second mode.

9. A computer program stored on a non-transitory computer-readable storage medium which causes a computer to function as an image processing apparatus including each unit of claim 8.

10. A method of controlling an image processing apparatus which displays a moving image by processing image data, comprising:
the driving step of dividing one frame of the image data into a plurality of subframes and driving the subframes;
the polarity inversion step of outputting a first subframe included in said one frame and a second subframe following the first subframe at opposite polarities;
the control step of outputting the image data while switching a phase mode between a first mode of driving the first subframe at positive polarity and the second subframe at negative polarity and a second mode of driving the first subframe at negative polarity and the second subframe at positive polarity;
the first input step and the second input step of inputting the image data; and
an input switching step of switching between said first input step and said second input step and causing one of said first input step and said second input step to input the image data,
wherein said control step switches the phase mode between the first mode and the second mode in accordance with a timing of causing said input switching step to switch between said first input step and said second input step.

11. A method of controlling an image processing apparatus which displays a moving image by processing image data, comprising:
the driving step of dividing one frame of the image data into a plurality of subframes and driving the subframes;
the polarity inversion step of outputting a first subframe included in said one frame and a second subframe following the first subframe at opposite polarities;
the control step of outputting the image data while switching a phase mode between a first mode of driving the first subframe at positive polarity and the second subframe at negative polarity and a second mode of driving the first subframe at negative polarity and the second subframe at positive polarity; and
a determination step of determining whether a scene change exists in a plurality of continuous image data,
wherein upon determining that the scene change exists, said control step switches the phase mode between the first mode and the second mode.

12. A method of controlling an image processing apparatus which displays a moving image by processing image data, comprising:
the driving step of dividing one frame of the image data into a plurality of subframes and driving the subframes;
the polarity inversion step of outputting a first subframe included in said one frame and a second subframe following the first subframe at opposite polarities;
the control step of outputting the image data while switching a phase mode between a first mode of driving the first subframe at positive polarity and the second subframe at negative polarity and a second mode of driving the first subframe at negative polarity and the second subframe at positive polarity; and
a light amount control step of controlling an amount of light to be output from the image processing apparatus,
wherein when the light amount controlled by said light amount control step is not more than a predetermined level, or when a controlled variable of the light amount by said light amount control step exceeds a predetermined controlled variable, said control step switches the phase mode between the first mode and the second mode.

* * * * *